Figure 1:
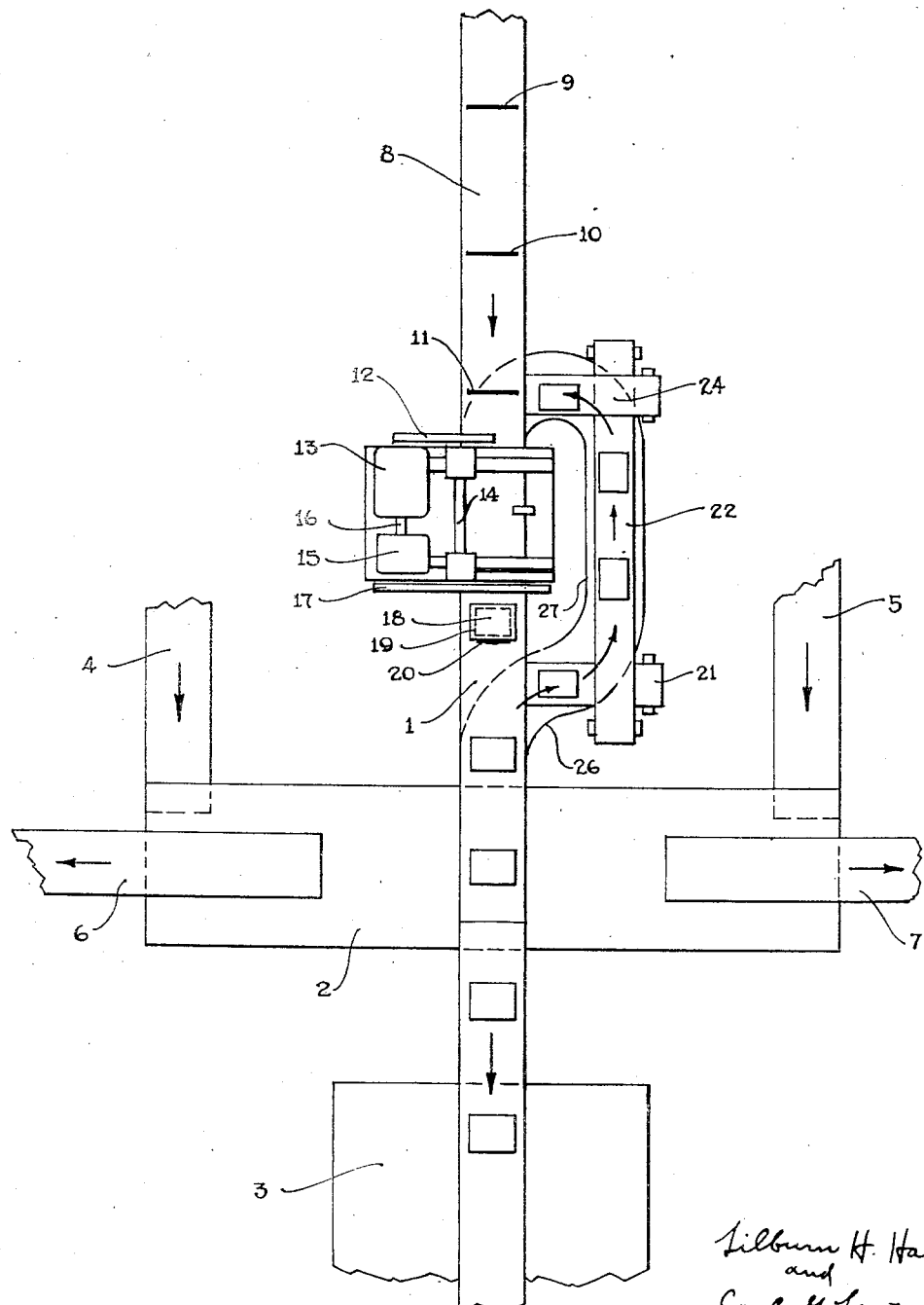

July 23, 1935.    L. H. HALL ET AL    2,009,259
WEIGHING MEANS
Filed June 1, 1931    2 Sheets-Sheet 1

Witness-

INVENTORS
Lilburn H. Hall
and
Carl G. Linton

BY

ATTORNEY

Patented July 23, 1935

2,009,259

UNITED STATES PATENT OFFICE 2,009,259

WEIGHING MEANS

Lilburn H. Hall and Carl G. Linton, Fort Worth, Tex., assignors, by mesne assignments, to Industrial Patents Corporation, Chicago, Ill., a corporation of Delaware Application June 1, 1931, Serial No. 541,290

4 Claims. (Cl. 249—59)

Our invention relates to means for slicing and weighing bacon and like product. One of the objects of our invention is to provide an automatic scaling means; another object of our invention is to provide means for grouping sliced bacon in weighed lots during the continuous operation of a slicing machine. Other objects of our invention will be apparent from the description and claims which follow.

Figure 2:
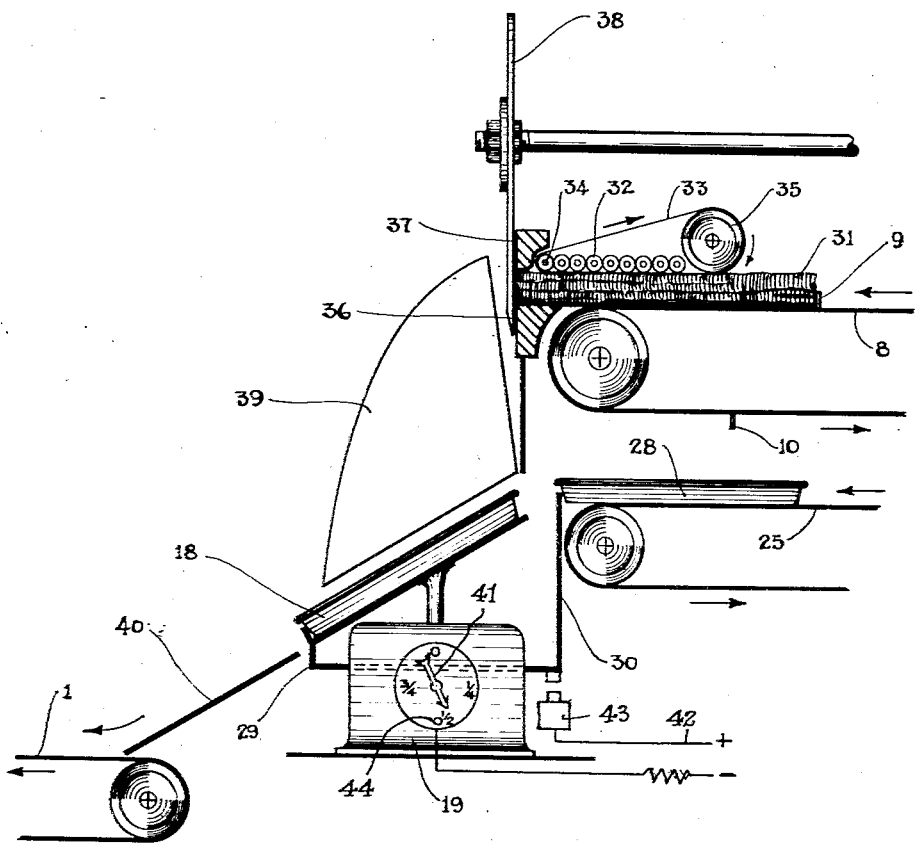

Referring now to the drawings, in which similar characters of reference refer to similar parts in the different figures:

Figure 1 is a diagrammatic view of a single bacon slicing and weighing unit embodying our invention. Figure 2 is a view partly in section showing the scaling mechanism.

Conveyor 1 receives loaded pan 18 as it travels from scale 19 down inclined chute 40 and carries the same to weighing and grading table 2 and thence to packing table 3. Conveyors 4 and 5 lead from similar slicing and weighing units not shown from which it will be seen that a complete unit comprises three slicing and weighing machines to each weighing and grading table. Chutes 6 and 7 lead to other packing tables not shown.

In operation, slabs of bacon 31 are placed upon conveyor 8, and carried to knife 38 by strips or cleats as 9, 10 and 11. In the unit shown diagrammatically in Figure 1 of the drawings, 12 represents a chain by which knife mandrel 14 is driven by motor 13. Gear box 15 interposed between motor 13 and shaft 16 houses appropriate speed changing mechanism for reducing the rotation of shaft 16 by which power is transmitted to the conveyor belts. The knife is protected by guard 17. As the product passes beneath the knife, the slices are deflected by guard 39 to pan 18, retained on scale 19, by catch 29. Pan 18 is electrically released as diagrammatically illustrated in Fig. 2 of the drawings when sufficient quantity of the product has fallen into pan 18. The automatic trip scale has an inclined weighing member and when the catch 29 is released the loaded pan or receptacle slides down the inclined weighing member and is delivered to the endless conveyor 1 as hereinafter more fully described.

The weighing member of scale 19 upon which pan 18 is rested, is preferably set at an angle of 40 degrees to facilitate quick removal of pan 18 by the action of gravity alone when catch 29 is released. When released by catch 29, pan 18 will slide down inclined chute 40 to conveyor 1 whence it will be carried to grading table 2.

At table 2 the product is removed from pan 18 and pan 18 placed upon the return flight of conveyor 1. By means of guides 26 and 27, pan 18 will be automatically returned by conveyors 21, 22, 23, 24 and 25 to conveyor 8 and in turn advanced to scale 19 for reuse.

It will be noted by reference to Figure 2 that pan 18 is in filling position on scale 19. Pan 28 is in the reserve position on conveyor 25. It will be noted that arm 29 and arm 30 operate to retain pans 18 and 28 respectively.

In Figure 2, a slab of bacon is shown being sliced. It will be noted that the bacon, as it is advanced toward knife 38, is subjected to pressure from the top by a series of pressure rollers as 32, carried by belt 33, operating over shafts 34 and 35. Fixed slicing bar 36 is provided as an anvil. Pressure bar 37 operates to keep product 31 in close contact with anvil 36 while being subjected to the action of knife 38. As the product is sliced by the knife, it is deflected by guard 39 into pan 18. When a sufficient quantity of product has fallen into pan 18, scale 19 moves downwardly, causing a contact 41 to close the circuit 42 and energize an electromagnet 43 of the circuit and pull the catches or stops 29 and 30 downwardly and thereby release the loaded receptacle 18 on the scale and the empty receptacle 28 on the conveyor 25. The pivoted hand of the scale constitutes a movable contact 41 which engages a fixed contact 44 of the said circuit 42 to close the latter as clearly illustrated in Figure 2 of the drawings.

It will be noted that rod 30 is not connected to the scale 19 but is tripped at the same time as arm 29. When arm 29 is tripped, pan 18 slides down inclined plane of the chute 40 to conveyor 1 as hereinbefore described.

It will be understood that although but one specific embodiment of our invention is disclosed herein, changes may be made in the details thereof without departing from the spirit of our invention as described in the following claims:

We claim:

1. The combination of an automatic trip scale having an inclined weighing member, a conveyor extending to a point adjacent the upper edge of the inclined weighing member for delivering an empty receptacle to the same, a conveyor extending from a point adjacent the lower edge of the weighing member for conveying loaded receptacles from the automatic trip scale, and electrically operated means automatically controlled by the scale and having separate receptacle engaging means cooperating with the scale and with the first-mentioned conveyor for releasably retaining a receptacle on the weighing member and on the said first-mentioned conveyor.

2. The combination of an automatic trip scale having an inclined weighing member, a conveyor extending to a point adjacent the upper edge of the inclined weighing member for delivering an empty receptacle to the same, a conveyor extending from a point adjacent the lower edge of the weighing member for conveying loaded receptacles from the automatic trip scale, catches located at the lower edge of the weighing member and at the delivery end of the first-mentioned conveyor for retaining a receptacle on the weighing member and a receptacle on the first-mentioned conveyor and out of contact with the said receptacle until the scale is tripped, and electrically operated means automatically controlled by the scale for withdrawing the catches to release a receptacle on the weighing member and a receptacle on the said first-mentioned conveyor.

3. The combination of an automatic trip scale having an inclined weighing member, a conveyor extending to a point adjacent the upper edge of the inclined weighing member for delivering an empty receptacle to the same, a conveyor extending from a point adjacent the lower edge of the weighing member for conveying loaded receptacles from the automatic scale, a stop located at the delivery end of the first-mentioned conveyor for positively retaining a receptacle on the same until the scale is tripped, and electrically operated means automatically controlled by the scale for withdrawing the stop for releasing the receptacle on the first-mentioned conveyor.

4. The combination of an automatic trip scale having an inclined weighing member, a conveyor extending to a point adjacent the upper edge of the inclined weighing member for delivering an empty receptacle to the same, a conveyor extending from a point adjacent the lower edge of the weighing member for conveying loaded receptacles from the automatic trip scale, an arm arranged to retain an empty receptacle on the first-mentioned conveyor until the scale is tripped, a catch for retaining a receptacle on the weighing member until the scale is tripped, and electrically operated means controlled by the scale for withdrawing the said arm and the catch for releasing an empty receptacle on the first-mentioned conveyor and for simultaneously releasing a receptacle on the weighing member.

LILBURN H. HALL.
CARL G. LINTON.